(12) United States Patent
Aoki et al.

(10) Patent No.: US 10,569,512 B2
(45) Date of Patent: Feb. 25, 2020

(54) MULTILAYER FOAM SHEET AND INTERLEAF SHEET FOR GLASS PLATES

(71) Applicant: JSP CORPORATION, Tokyo (JP)

(72) Inventors: Takeshi Aoki, Nikko (JP); Takashi Nishimoto, Utsunomiya (JP); Mikidai Fujita, Utsunomiya (JP); Ryohei Takeuchi, Utsunomiya (JP)

(73) Assignee: JSP CORPORATION, Tokyo (JP)

(*) Notice: Subject to any disclaimer, the term of this patent is extended or adjusted under 35 U.S.C. 154(b) by 0 days.

(21) Appl. No.: 16/140,637

(22) Filed: Sep. 25, 2018

(65) Prior Publication Data

US 2019/0084279 A1   Mar. 21, 2019

Related U.S. Application Data

(63) Continuation of application No. 15/122,559, filed as application No. PCT/JP2015/055550 on Feb. 26, 2015, now Pat. No. 10,124,564.

(30) Foreign Application Priority Data

| Mar. 5, 2014 | (JP) | ................................ 2014-042482 |
| Dec. 10, 2014 | (JP) | ................................ 2014-249682 |
| Jan. 14, 2015 | (JP) | ................................ 2015-004888 |

(51) Int. Cl.
*B32B 27/06* (2006.01)
*B32B 27/32* (2006.01)
(Continued)

(52) U.S. Cl.
CPC .............. *B32B 27/065* (2013.01); *B32B 5/18* (2013.01); *B32B 5/20* (2013.01); *B32B 25/14* (2013.01);
(Continued)

(58) Field of Classification Search
CPC ......... B32B 27/065; B32B 5/18; B32B 25/14; B32B 27/302; B32B 2307/21; B65D 57/00; B65D 85/48; C08J 9/141; C08J 2323/06
See application file for complete search history.

(56) References Cited

U.S. PATENT DOCUMENTS

| 4,581,262 A | 4/1986 | Karabedian |
| 6,986,941 B2 | 1/2006 | Morita et al. |
| 2004/0262802 A1 | 12/2004 | Morita et al. |

FOREIGN PATENT DOCUMENTS

| CN | 1986618 A | 6/2007 |
| CN | 102596768 A | 7/2012 |

(Continued)

OTHER PUBLICATIONS

International Search Report (ISR) dated May 19, 2015, for PCT/JP2015/055550.

(Continued)

*Primary Examiner* — Hai Vo
(74) *Attorney, Agent, or Firm* — Bacon & Thomas, PLLC

(57) ABSTRACT

A multi-layer foam sheet with an apparent density of 30 to 300 kg/m$^3$ and a thickness of 0.05 to 2 mm, including a foam layer containing a polyethylene-based resin, and an antistatic layer fusion-laminated by coextrusion on each of both sides of the foam layer. The antistatic layer has a basis weight of 1 to 10 g/m$^2$ and contains a polyethylene-based resin, a polystyrene-based resin, a styrenic elastomer, and a polymeric antistatic agent, with the polystyrene-based resin being contained in the antistatic layer in an amount of 15 to 70% by weight.

9 Claims, 8 Drawing Sheets

(51) Int. Cl.
*B65D 65/40* (2006.01)
*B65D 85/48* (2006.01)
*B65D 57/00* (2006.01)
*C08L 23/04* (2006.01)
*B32B 27/18* (2006.01)
*B32B 27/30* (2006.01)
*B32B 5/20* (2006.01)
*B32B 25/14* (2006.01)
*C08L 23/02* (2006.01)
*B32B 5/18* (2006.01)
*B65D 81/107* (2006.01)
*C08J 9/14* (2006.01)

(52) U.S. Cl.
CPC ............ *B32B 27/18* (2013.01); *B32B 27/302* (2013.01); *B32B 27/32* (2013.01); *B65D 57/00* (2013.01); *B65D 65/40* (2013.01); *B65D 81/107* (2013.01); *B65D 85/48* (2013.01); *C08L 23/02* (2013.01); *C08L 23/04* (2013.01); *B32B 2250/03* (2013.01); *B32B 2250/40* (2013.01); *B32B 2266/025* (2013.01); *B32B 2270/00* (2013.01); *B32B 2307/21* (2013.01); *B32B 2307/56* (2013.01); *B32B 2307/746* (2013.01); *B32B 2323/046* (2013.01); *B32B 2325/00* (2013.01); *B32B 2457/202* (2013.01); *B32B 2553/02* (2013.01); *B65D 2213/02* (2013.01); *C08J 9/141* (2013.01); *C08J 2201/03* (2013.01); *C08J 2203/14* (2013.01); *C08J 2203/182* (2013.01); *C08J 2323/06* (2013.01)

(56) References Cited

FOREIGN PATENT DOCUMENTS

| | | | | |
|---|---|---|---|---|
| CN | 103338912 A | 10/2013 | | |
| EP | 0464499 A2 * | 1/1992 | ........... | G02B 5/0242 |
| JP | S4928676 A | 3/1974 | | |
| JP | 19860164824 A | 1/1999 | | |
| JP | 2006-231542 A | 9/2006 | | |
| JP | 2007-262409 A | 10/2007 | | |
| JP | 2010-042556 A | 2/2010 | | |
| JP | 2010247529 | 11/2010 | | |
| JP | 2011-006567 A | 1/2011 | | |
| JP | 2011-162761 A | 8/2011 | | |
| JP | 2011252040 A | 12/2011 | | |
| JP | 2012020766 A | 2/2012 | | |
| JP | 2013-010325 A | 1/2013 | | |
| JP | 2013-112765 A | 6/2013 | | |
| WO | 2011006031 A2 | 1/2011 | | |
| WO | 2012105237 | 7/2014 | | |

OTHER PUBLICATIONS

Supplemental European Search Report dated Sep. 20, 2017, for EP 15758269.
Chinese Search Report in Chinese Application No. 2015800119121, dated Dec. 4, 2017.
Taiwan Search Report in related Taiwan Application No. 104106820, dated Jul. 31, 2018.

* cited by examiner

MULTILAYER FOAM SHEET AND INTERLEAF SHEET FOR GLASS PLATES

The present invention relates to a multi-layer foam sheet and, more specifically, to a multi-layer foam sheet that is suitably usable as an interleaf sheet for plates such as glass plates for substrates.

BACKGROUND OF THE INVENTION

When glass plates for use as liquid crystal panels are transported in a stacked state, interleaf sheets have been hitherto used for protection thereof. While paper was used as such an interleaf sheet, polyethylene-based resin foam sheets have been employed in recent years. (Patent Document 1, for example).

Foam sheets that are used as the interleaf sheets are required not only to have a cushioning property for protecting glass plates to be packaged but also to be low in degree of sag, when cantilever-supported, so that excellent handling property is achieved when they are inserted between glass plates. When the glass plates are subjected to processing and fabrication works, it is necessary to remove, by vacuum suction, the foam sheets inserted between the glass plates. In this case, if the foam sheets show an excessively high degree of sag when cantilever-supported, the efficiency of the removal procedures such as by vacuum suction will be deteriorated because portions of the foam sheets protruded from the glass plates are apt to hang down and foam sheets become wrinkled.

Patent Document 1: JP-A-2007-262409

On the other hand, in recent years, as glass plates for use in liquid crystal panels become larger and thinner, thinner foam sheets for use as interleaf sheets for such glass plates are demanded. Thus, there is an increasing demand for a thin foam sheet that has sufficient cushioning property as an interleaf sheet and, yet, that does not greatly sag.

It is, therefore, an object of the present invention to provide a multi-layer foam sheet which is thinner and lighter in weight than those of conventional multi-layer foam sheets for use as interleaf sheets and which has sufficient cushioning property and a low degree of sag and is suited for use as an interleaf sheet for glass plates for substrates.

SUMMARY OF THE INVENTION

In accordance with the present invention, there are provided the following multi-layer foam sheets and interleaf sheets for glass plates.

[1] A multi-layer foam sheet having an apparent density of 30 to 300 kg/m$^3$ and a thickness of 0.05 to 2 mm, said multi-layer foam sheet comprising a foam layer that comprises a polyethylene-based resin (A), and an antistatic layer that is lamination bonded by coextrusion to each of both sides of the foam layer,
wherein the antistatic layer has a basis weight of 1 to 10 g/m$^2$ and contains a polyethylene-based resin (B), a polystyrene-based resin, a styrenic elastomer and a polymeric antistatic agent, with the polystyrene-based resin being present in an amount of 15 to 70% by weight based on the weight of the antistatic layer.

[2] The multi-layer foam sheet as recited in above [1], wherein the polyethylene-based resin (B) forms a continuous phase, while the polystyrene-based resin and the polymeric antistatic agent separately form dispersed phases that are dispersed in the continuous phase.

[3] The multi-layer foam sheet as recited in above [2], wherein the polystyrene-based resin is present in an amount of 15 to 50% by weight based on the weight of the antistatic layer.

[4] The multi-layer foam sheet as recited in above [1], wherein both of the polyethylene-based resin (B) and the polystyrene-based resin form continuous phases with the polymeric antistatic agent being dispersed in the continuous phase of the polyethylene-based resin (B).

[5] The multi-layer foam sheet as recited in above [4], wherein the polystyrene-based resin is present in an amount of 25 to 60% by weight based on the weight of the antistatic layer.

[6] The multi-layer foam sheet as recited in any one of above [1] to [5], wherein the styrenic elastomer is present in an amount of 2 to 20% by weight based on the weight of the antistatic layer.

[7] The multi-layer foam sheet as recited in any one of above [1] to [6], wherein the polymeric antistatic agent is present in an amount of 2 to 30% by weight based on the weight of the antistatic layer.

[8] The multi-layer foam sheet as recited in any one of above [1] to [7], wherein the polyethylene-based resin (A) contains low density polyethylene as a major component.

[9] The multi-layer foam sheet as recited in any one of above [1] to [8], wherein the polyethylene-based resin (B) contains low density polyethylene as a major component.

[10] An interleaf sheet for glass plates comprising a multi-layer foam sheet as recited in any one of above [1] to [9].

The multi-layer foam sheet according to the present invention has a sandwich structure in which two antistatic layers in the form of thin films are laminated and bonded by coextrusion to both sides of a polyethylene-based resin foam layer (hereinafter occasionally referred to simply as "foam layer").

Because the foam layer is constituted of a polyethylene-based resin and because each of the antistatic layers is in the form of a thin film, the multi-layer foam sheet has excellent cushioning property.

Further, because each of the antistatic layers contains a polymeric antistatic agent and shows excellent antistatic property, the multi-layer foam sheet of the present invention does not easily get accumulated with static charges and is not easily deposited with dust.

Additionally, because each of the antistatic layers contains a polyethylene-based resin, a polystyrene-based resin and a styrenic elastomer, the multi-layer foam sheet having such laminated and bonded antistatic layers has a proper stiffness and is less prone to sag as compared to conventional foam sheets with similar thickness.

The multi-layer foam sheet according to the present invention, therefore, is excellent in cushioning property and antistatic property, is less prone to sag even when the thickness thereof is made thin, has excellent handling property such as followability at the time of vacuum suction, and is suitably used as an interleaf sheet for glass plates used for precision electronic instruments.

DETAILED DESCRIPTION OF THE INVENTION

Figure 1:
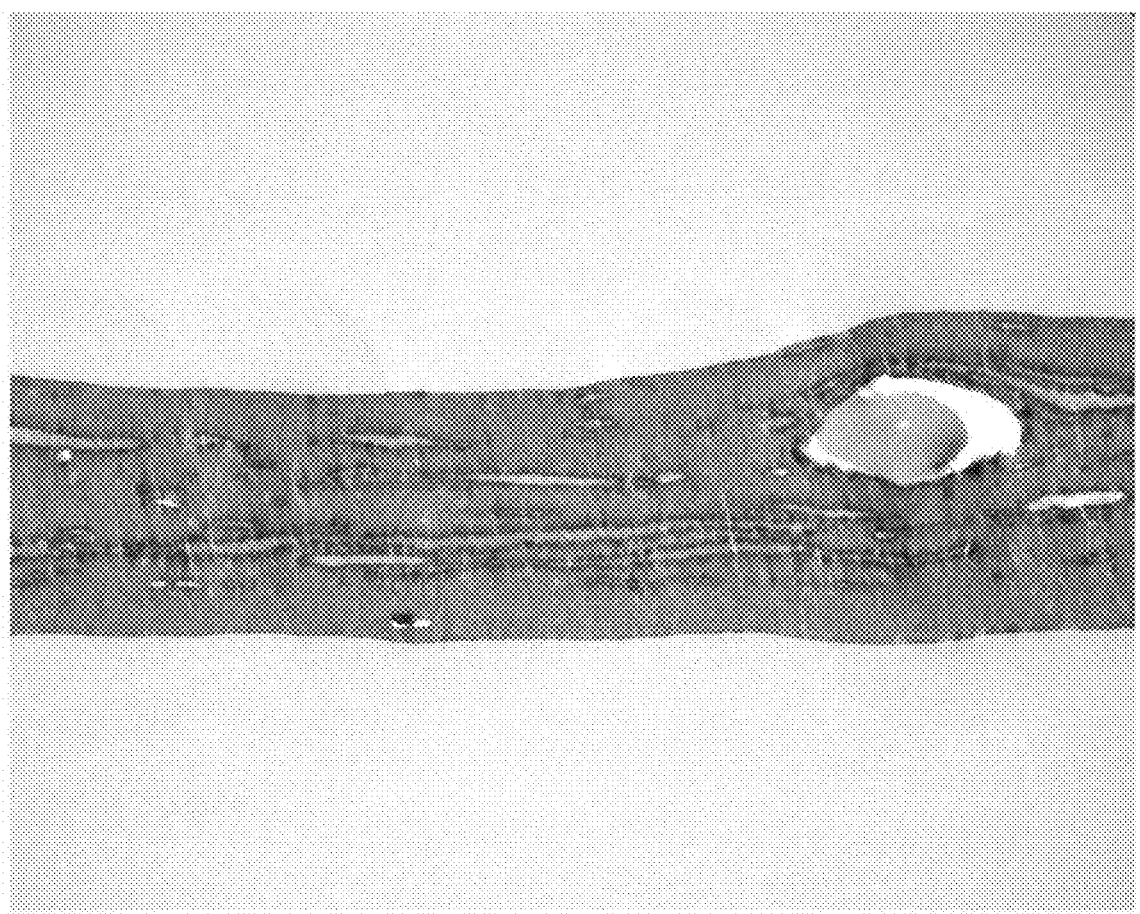
FIG. 1 is a transmission electron photomicrograph (at magnification of 15,400) of a longitudinal cross-section of an antistatic layer of a multilayer foam sheet obtained in Example 5.

The multi-layer foam sheet of the present invention will be next described in detail.

The multi-layer foam sheet comprises a polyethylene-based resin foam layer, and an antistatic layer that is laminated and bonded by coextrusion to each of both sides of the foam layer. That is, the multi-layer foam sheet has a sandwich structure in which the foam layer is sandwiched between two antistatic layers. In the following description, the language "antistatic layer" is intended to refer to "each of the two antistatic layers" unless otherwise specifically noted. The antistatic layer contains at least a polyethylene-based resin, a polystyrene-based resin, a styrenic elastomer and a polymeric antistatic agent. Because of this constitution, the multi-layer foam sheet can maintain cushioning property even when the thickness thereof is made thin. At the same time, the foam sheet is less prone to sag as a whole, has excellent handling property and shows excellent antistatic property. Thus, the multi-layer foam sheet excels in followability or the like property at the time of vacuum suction and, therefore, can be used as an interleaf sheet for glass plates for use in electronic instruments.

The multi-layer foam sheet has a thickness of 0.05 to 2 mm. In consideration of a trend to make glass plates for substrates larger and thinner in recent years as described above, the upper limit of the thickness is preferably 1.5 mm, more preferably 1.3 mm, still more preferably 1.0 mm. On the other hand, the lower limit of the thickness is preferably 0.07 mm, more preferably 0.10 mm, still more preferably 0.15 mm, for reasons of ensuring higher cushioning property.

The multi-layer foam sheet as a whole has an apparent density of 30 kg/m$^3$ or more, preferably 35 kg/m$^3$ or more, still more preferably 40 kg/m$^3$ or more. In an ordinary foam sheet, the lower the apparent density thereof, the lower becomes the stiffness and, therefore, the greater becomes its tendency to sag. In contrast, the multi-layer foam sheet of the present invention which has specific antistatic layers, is less prone to sag even though the multi-layer foam sheet as a whole has a low apparent density. From the standpoint of the cushioning property, the upper limit of the apparent density is 300 kg/m$^3$, more preferably 200 kg/m$^3$.

From the standpoint of handling efficiency, the basis weight of the multi-layer foam sheet preferably has an upper limit of 200 g/m$^2$, more preferably 100 g/m$^2$, still more preferably 50 g/m$^2$, particularly preferably 30 g/m$^2$. The lower limit of the basis weight is preferably about 10 g/m$^2$, more preferably 20 g/m$^2$.

As used herein, the thickness of the multi-layer foam sheet as a whole is an arithmetic mean of measured values obtained by measuring the thickness (mm) of the multi-layer foam sheet at every 1 cm interval throughout the width thereof.

The apparent density (kg/m$^3$) of the multi-layer foam sheet as used herein is determined by dividing the basis weight (g/m$^2$) of the multi-layer foam sheet by the thickness (mm) of the multi-layer foam sheet, followed by unit conversion into kg/m$^3$.

The multi-layer foam sheet preferably has a width of 1,000 mm or more so as to be usable for packaging large sized glass plates. The upper limit of the width is about 5,000 mm.

It is preferred that the multi-layer foam sheet preferably has a closed cell content of 15% or more, particularly 20% or more, from the standpoint of cushioning property, surface protecting property for materials to be packaged and suitable slippage of the foam sheet.

The closed cell content is obtained according to Procedure C of ASTM D-2856-70 using true volume Vx of a multi-layer foam sheet (cut sample). The closed cell content S (%) is calculated by the formula (1) shown below. At this time, a cut sample having a size of 25 mm×25 mm×about 20 mm is obtained by stacking plural numbers of samples each having a size of 25 mm×25 mm×(thickness of the multi-layer foam sheet). A measuring device such as Air Comparison Pycnometer Model 930 manufactured by Toshiba Beckman Inc. may be used.

$$S[\%]=(Vx-W/\rho)\times 100/(Va-W/\rho) \qquad (1)$$

wherein Vx represents the true volume (cm$^3$) of the cut sample measured by the above method, which corresponds to a sum of a volume of the resin constituting the cut sample and a total volume of the closed cells of the cut sample, Va represents an apparent volume (cm$^3$) of the cut sample that is used for the measurement, the apparent volume corresponding to a sum of a volume of the resin constituting the cut sample and a total volume of all the closed cells and the open cells of the cut sample, W is a total weight (g) of the cut sample used for the measurement; and $\rho$ is a density (g/cm$^3$) of the resin composition determined after defoaming the multi-layer foam sheet.

Description will be next made of a resin that constitutes the foam layer of the multi-layer foam sheet. The foam layer is formed of a polyethylene-based resin. For the purpose of making a distinction between the polyethylene-based resin that constitutes the foam layer and the polyethylene-based resin that constitutes the antistatic layer, which will be described hereinafter, the polyethylene-based resin that constitutes the foam layer will be hereinafter occasionally referred to as "polyethylene-based resin (A)", while the polyethylene-based resin that constitutes the antistatic layer will be hereinafter occasionally referred to as "polyethylene-based resin (B)".

As used herein, the term "polyethylene-based resin" is intended to refer to a resin that has at least 50 mol % of ethylene component units. Specific examples of the polyethylene-based resin include low density polyethylene (LDPE), ethylene-vinyl acetate copolymers (EVA), liner low density polyethylene (LLDPE), very low density polyethylene (VLDPE) and mixtures thereof.

As the polyethylene-based resin A, it is preferable to use a polyethylene-based resin that contains low density polyethylene as a major component, because the foaming property thereof is excellent and because the obtained multi-layer foam sheet has, therefore, excellent cushioning property. As used herein, the term "low density polyethylene" is intended to refer to polyethylene resin that has a long-chain branching structure and that has a density of about 910 kg/m$^3$ or more and 930 kg/m$^3$ or less.

The term "contains low density polyethylene as a major component" is intended to mean that the polyethylene-based resin (A) contains low density polyethylene in an amount of at least 50% by weight. The polyethylene-based resin (A) more preferably contains low density polyethylene in an amount of at least 70% by weight, still more preferably at least 90% by weight, and particularly preferably consists only of low density polyethylene.

To the extent that the object and effect of the present invention are not impaired, the foam layer may be added with other synthetic resins, elastomers and additives such as a cell controlling agent, a nucleating agent, an antioxidant, a heat stabilizer, a weathering agent, a UV absorbing agent, a flame retardant, an antibacterial agent, a shrinkage preventing agent and an inorganic filler.

The antistatic layer that is provided on each of the both sides of the foam layer will be next described. The antistatic layer contains, in the form of a mixture, a polyethylene-based resin (B), a polystyrene-based resin, a polymeric antistatic agent and a styrenic elastomer.

It is preferred that the polyethylene-based resin (B) forms a continuous phase in the antistatic layer. When the polyethylene-based resin (B) forms a continuous phase, the antistatic layer shows good adhesiveness to the foam layer. From this point of view, the polyethylene-based resin (B) is preferably present in the antistatic layer in an amount of 20 to 80% by weight.

It is also preferred that the polyethylene-based resin (B) has a melting point of 140° C. or less, more preferably 120° C. or less for reasons of easiness in forming a continuous phase. The lower limit of the melting point is about 80° C.

As used herein, the melting point of the polyethylene-based resin is a peak temperature of a fusion peak that is measured on the basis of a method for measuring transition temperature of a plastic as referenced in JIS K7121(1987) by adopting, as adjustment of the condition of test piece, "(2) measurement of melting temperature after conducting a specified heat treatment".

It is preferred that the kind of the polyethylene-based resin (B) is the same as that of the polyethylene-based resin (A), since the cells of the foam layer are hardly broken during coextrusion stage and since the adhesion between the foam layer and the antistatic layer is excellent. More specifically, the polyethylene-based resin (B) is preferably a polyethylene-based resin that contains low density polyethylene as its major component. Different kinds of resins may be also used, however.

Examples of the polystyrene-based resin include polystyrene (general purpose polystyrene), rubber-modified polystyrene (impact resistant polystyrene), styrene-α-methylstyrene copolymer, styrene-p-methylstyrene copolymer, styrene-acrylic acid copolymer, styrene-methacrylic acid copolymer, styrene-maleic anhydride copolymer, styrene-methyl methacrylate copolymer, styrene-ethyl methacrylate copolymer, styrene-methyl acrylate copolymer, styrene-ethyl acrylate copolymer and styrene-acrylonitrile copolymer. Above all, polystyrene and rubber-modified polystyrene are preferred for reasons of easiness in obtaining good antistatic layer.

The polystyrene-based resin is preferably contained in the antistatic layer in an amount of 15 to 70% by weight. When the content is excessively low, there is a fear that the stiffness of the multi-layer foam sheet becomes insufficient. When the content is excessively high, on the other hand, there is a fear that the foam layer and the antistatic layer fail to bond to each other. From this point of view, the lower limit of the polystyrene-based resin content is preferably 15% by weight, more preferably 20% by weight, still more preferably 25% by weight, particularly preferably 30% by weight. The upper limit is preferably 60% by weight, more preferably 50% by weight.

It is preferred that the polystyrene-based resin has a melt flow rate (MFR) of 5.0 to 30 g/10 min and that the MFR is about 0.5 to 2 times that of the polyethylene-based resin (B) for reasons that addition of such a polystyrene-based resin in a small amount can give a multi-layer foam sheet having sufficient stiffness (its tendency to sag is low). As used herein, MFR is a value measured on the basis of JIS K7210(1999), Condition H (200° C., load of 5 kg).

The antistatic layer contains a styrenic elastomer. Examples of the styrenic elastomer include styrene-diene copolymer such as styrene-butadiene copolymer and styrene-isoprene copolymer, and partially or completely hydrogenated products of these copolymers. These copolymers are preferably block copolymers. As the styrene-diene block copolymers, there may be mentioned styrene-butadiene-styrene block copolymer and styrene-ethylene-butylene-styrene block copolymer.

It is preferred that the styrenic elastomer has a content of styrenic components in the range of 20 to 50% by weight, more preferably 30 to 40% by weight.

Because of the presence of the elastomer in the antistatic layer, the film forming property of the antistatic layer is improved and, hence, it is possible to form a good antistatic layer. More specifically, because of the improved film forming property, it is possible to laminate an antistatic layer with a basis weight of 1 to 10 g/m$^2$ on each of the both sides of a foam layer by coextrusion.

The styrenic elastomer is preferably contained in the antistatic layer in an amount of 2 to 20% by weight. The lower limit of the styrenic elastomer content is preferably 3% by weight, while upper limit thereof is preferably 15% by weight, more preferably 10% by weight. When the styrenic elastomer content falls within the above range, it is possible to achieve excellent balance between the film forming property of the antistatic layer at the time of coextrusion and the resistance to sag of the multi-layer foam sheet.

The antistatic layer contains a polymeric antistatic agent. The polymeric antistatic agent is preferably dispersed in a continuous phase of the polyethylene-based resin so that the multi-layer foam sheet may show antistatic property and may be imparted with a surface resistivity of $1 \times 10^7$ to $1 \times 10^{14} \Omega$, preferably $1 \times 10^7$ to $1 \times 10^{13} \Omega$. The multi-layer foam sheet having a surface resistivity of the above range has less tendency to accumulate electrostatic charges and is less prone to accumulate dust.

The surface resistivity is measured according to JIS K6271(2001). More specifically, a test piece (having a length of 100 mm, a width of 100 mm and a thickness equal to that of the multi-layer foam sheet to be measured) is cut out of the multi-layer foam sheet and subjected to conditioning adjustment by being allowed to stand in an environment with a temperature of 23° C. and a relative humidity of 50% for 24 hours. The test piece is then impressed from its surface side with a voltage of 500 V and measured for the surface resistivity 1 minute after the commencement of the voltage impression.

The polymeric antistatic agent is a resin having a surface resistivity of less than $1 \times 10^{12} \Omega$, preferably less than $1 \times 10^{11} \Omega$, more preferably less than $1 \times 10^{10} \Omega$. Specific examples of such a resin include polyethers, polyether ester amides, block copolymers of polyether and polyolefin, and ionomer resins. Of these, block copolymers of polyether and polyolefin, and ionomer resins are more preferred.

As the block copolymer, there may be mentioned those which have a structure in which polyolefin blocks and polyether blocks are alternately linked through a bond such as an ester bond, an amide bond, an ether bond, an urethane bond or an imide bond.

The ionomer resin is a copolymer of ethylene with a carboxylic acid such as acrylic acid, methacrylic acid and maleic acid, which is cross-linked with a metal salt. As the metal salt, there may be mentioned, for example, an alkali metal salt, an alkaline metal salt, a main group element salt and a transition metal salt.

As specific examples of the polymeric antistatic agent, there may be mentioned those which are commercially available under the trade name of "PELESTAT 300", "PELESTAT 230", "PELESTAT HC250", "PELECTRON PVH" "PELECTRON PVL" and "PELECTRON HS" (manufactured by Sanyo Chemical Industries, Ltd.) as polyether-polyolefin block copolymers, and "ENTILA SD100" and "ENTILA MK400" (manufactured by Du Pont Mitsui Polychemicals Co., Ltd.) as ionomer resins.

The polymeric antistatic agent is preferably contained in the antistatic layer in an amount of 2 to 30% by weight, more preferably 3 to 20 by weight, still more preferably 4 to 15% by weight, particularly preferably 5 to 15% by weight, although the content depends upon the performance of the polymeric antistatic agent.

The polymeric antistatic agent may be also incorporated into the foam layer. When the polymeric antistatic agent is contained in the foam layer, the content thereof in the foam layer is preferably 15% by weight or less, more preferably 8% by weight or less from the standpoint of foamability thereof in an extrusion stage.

Preferred embodiments of the morphology of the antistatic layer will be next described in detail.

There are two embodiments in which the polystyrene-based resin is distributed in a continuous phase of the polyethylene-based resin. In a first embodiment, the polystyrene-based resin forms dispersed phases (domains) that are dispersed in the continuous phase (matrix) of the polyethylene-based resin (sea-island structure). In the second embodiment, both of the polyethylene-based resin and the polystyrene-based resin form continuous phases (sea-sea structure).

In the morphology of the first embodiment, the polyethylene-based resin forms a continuous phase, the polystyrene-based resin forms dispersed phases and the polymeric antistatic agent also forms dispersed phases which differ from those of the polystyrene-based resin.

In the first embodiment, because the polystyrene-based resin, which has a higher modulus of elasticity than that of the polyethylene-based resin, forms domains in the matrix of the polyethylene-based resin, the multi-layer foam sheet is superior in stiffness as compared to conventional foam sheets (multi-layer foam sheet whose antistatic layer does not contain a polystyrene-based resin) and has less tendency to sag even when the thickness thereof is thin. For this reason, the multi-layer foam sheet has excellent handling property such as followability at the time of vacuum suction. Therefore, the multi-layer foam sheet can be handled in the same manner as in the conventional sheets even when its thickness is thin. Further, because the polymeric antistatic agent also forms dispersed phases in the polyethylene-based resin that are separate from those of the polystyrene-based resin, the multi-layer foam sheet is particularly excellent in the antistatic property. Thus, the formation of the morphology of the first embodiment makes it possible to achieve both improvement of stiffness and development of antistatic property of the antistatic layer. Namely, it is possible to make the multi-layer foam sheet less prone to sag while imparting antistatic property thereto.

In this connection, in case the polystyrene-based resin is dispersed in the polyethylene-based resin, the multi-layer foam sheet has much less tendency to sag when the polystyrene-based resin is dispersed in a form extended in the plane direction of the sheet than when it is dispersed in the form of particles.

As described above, it is preferred that the dispersed phases of the polystyrene-based resin in the first embodiment are in a form extended in the plane direction of the multi-layer foam sheet. It is more preferred that there are present polystyrene-based resin dispersed phases having an aspect ratio (which is a ratio of the length thereof in the long side direction (length in the plane direction of the sheet) to the length thereof in the short side direction (length in the thickness direction of the sheet) in a vertical cross-section of the multi-layer foam sheet) of 3 or more.

FIG. 1 to FIG. 4 illustrate examples of the morphology of the first embodiment. In these Figures, designated at 1 is a continuous phase of a polyethylene-based resin, at 2 is a dispersed phase of a polystyrene resin, and at 3 is a dispersed phase of a polymeric antistatic agent. The morphology of the antistatic layer may be confirmed by observation of a cross-section thereof using a transmission electron microscope or the like.

In the morphology of the second embodiment, both of the polyethylene-based resin and the polystyrene-based resin form continuous phases (dual continuous phase). Namely, the polyethylene-based resin forms a continuous phase and the polystyrene-based resin also forms a continuous phase with the polymeric antistatic agent forming dispersed phases that are dispersed in the continuous phase of the polyethylene-based resin. Thus, because the polyethylene-based resin forms a continuous phase and the polystyrene-based resin, which has higher bending strength and better stiffness than the polyethylene resin, also form a continuous phase, the multi-layer foam sheet of the present invention is superior in stiffness as compared to conventional foam sheets (multi-layer foam sheet whose antistatic layer does not contain a polystyrene-based resin) and has less tendency to sag even when the thickness thereof is thin and, further, has more excellent stiffness and higher resistance to sag as compared to the multi-layer foam sheet according to the above-described first embodiment. For this reason, the multi-layer foam sheet has excellent handling property such as followability at the time of vacuum suction. Therefore, the multi-layer foam sheet can be handled in the same manner as in the conventional sheets even when its thickness is thin.

Further, in the antistatic layer of the second embodiment, the polymeric antistatic agent forms dispersed phases that differ from those of the polystyrene-based resin. By virtue of this constitution, the antistatic layer exhibits excellent antistatic property and, hence, the multi-layer foam sheet having such an antistatic layer which is laminated and bonded does not easily get accumulated with static charges and is not easily deposited with dust.

It is preferred that the continuous phase of the polystyrene-based resin of the second embodiment orients and extends in the plane direction of the multi-layer foam sheet. It is also preferred that two or more layers, more preferably three or more layers, still more preferably 5 or more layers of the polystyrene-based resin continuous phase are present in the thickness direction of the antistatic layer.

Figure 5:
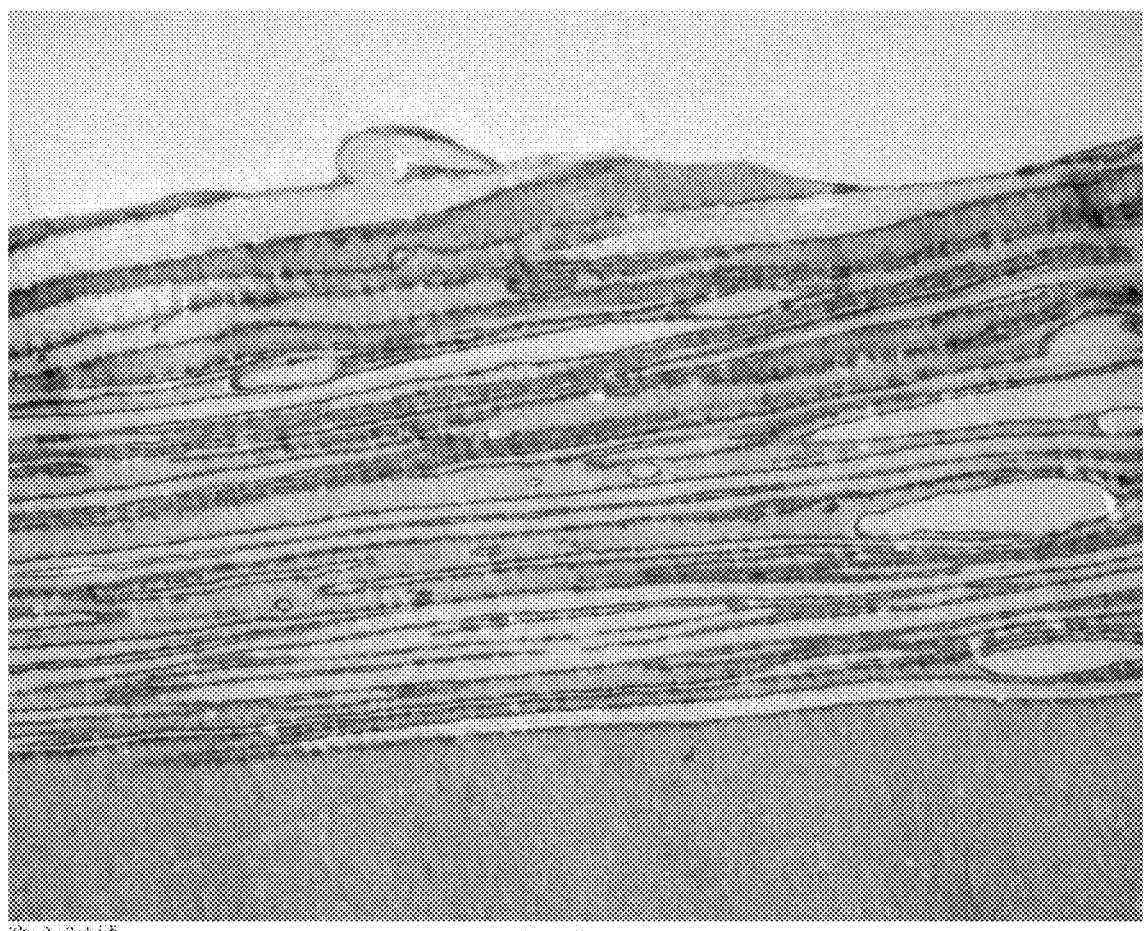
FIG. 5 is a transmission electron photomicrograph (at magnification of 15,400) of a longitudinal cross-section of an antistatic layer of a multilayer foam sheet obtained in Example 10.
Figure 6:
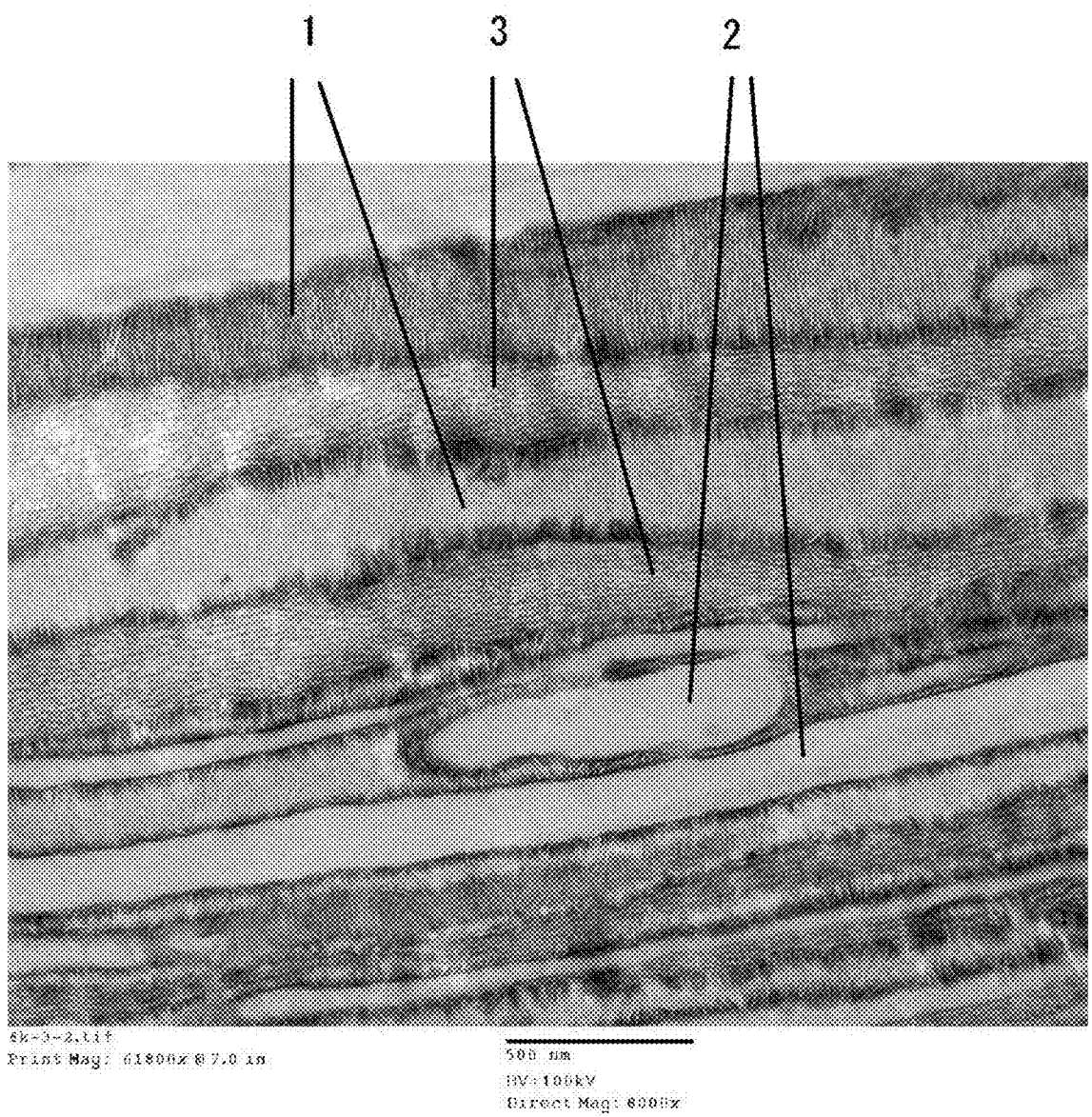
FIG. 6 is a transmission electron photomicrograph (at magnification of 61,800) of a longitudinal cross-section of an antistatic layer of a multilayer foam sheet obtained in Example 10.

FIG. 5 and FIG. 6 illustrate an example of the morphology of the second embodiment. In these Figures, designated at 1 is a continuous phase of a polyethylene-based resin, at 2 is a continuous phase of a polystyrene resin, and at 3 is a dispersed phase of an antistatic agent which will be described hereinafter. The morphology of the antistatic layer may be confirmed by observation of a cross-section thereof using a transmission electron microscope or the like.

The basis weight of the antistatic layer, namely the basis weight of each of the two antistatic layers provided on both sides of the foam layer is 10 g/m$^2$ or less. When the basis weight of the antistatic layer is within the above range, the cushioning property of the foam layer is not adversely affected and, hence, the multi-layer foam sheet exhibits sufficient cushioning property. From this point of view, the upper limit of the basis weight of the antistatic layer is preferably 5 g/m$^2$, more preferably 3 g/m$^2$, still more preferably 2 g/m$^2$. From the standpoint of formation of a good antistatic layer that is free of torn portions even though its thickness is thin, the lower limit of the basis weight of the antistatic layer is 1 g/m$^2$. It is also preferred that the antistatic layers on both sides have as equal a basis weight as possible from the stand point of handling property.

As described in the foregoing, the multi-layer foam sheet of the present invention can exhibit sufficient stiffness even when the antistatic layers have a small basis weight because of the above-described morphology of the antistatic layers.

Description will be next made of a method for preparing the multi-layer foam sheet of the present invention. As a method for preparing the multi-layer foam sheet, there may be adopted a coextrusion foaming process in which a first melt for forming the antistatic layer and a second melt for forming the foam layer are combined and laminated within a die, and then coextruded and foamed. By adopting such a coextrusion foaming process, it is possible to obtain a multi-layer foam sheet in which the thickness of the antistatic layer is made small and the adhesion strength between the antistatic layer and foam layer is high.

As a method for producing a multi-layer foam sheet in the form of a sheet by the coextrusion foaming process, there may be mentioned, for example, a method in which a coextrusion flat die is used for the coextrusion foaming of a sheet to obtain a multi-layer foam sheet in the form of a sheet, and a method in which a coextrusion circular die is used for the coextrusion foaming of a tubular laminated foam product, the resulting product being thereafter cut open to obtain a multi-layer foam sheet in the form of a sheet. Among these methods, the method using the coextrusion circular die is preferred for reasons that a wide multi-layer foam sheet with a width of 1,000 mm or more may be prepared with ease and polystyrene-based resin dispersed phases in the antistatic layer can be easily extended in the plane direction.

The method in which the coextrusion is carried out using the circular die will be next described in detail. First, the above-described polyethylene-based resin (A) and, if necessary, an additive or additives such as a cell controlling agent, are fed to an extruder for forming the foam layer and heated and kneaded. Thereafter, a physical blowing agent is injected into the extruder and further kneaded to obtain a first melt for forming the foam layer. At the same time, the above-described polyethylene-based resin (B), polystyrene-based resin, styrenic elastomer and polymeric antistatic agent are fed to an extruder for forming the antistatic layer and heated and kneaded to obtain a second melt for forming the antistatic layer. The first and second melts are then supplied to a coextrusion circular die, laminated and coextruded therethrough to form a multi-layer foam sheet.

It is preferred that the polyethylene-based resin (A) has MFR of 0.5 to 15 g/10 min for reasons of good foamability. The polyethylene-based resin (B) preferably has MFR which is the same as or greater than that of the polyethylene-based resin (A) for reasons of properly laminating the antistatic layer on the foam layer by coextrusion. In particular, the melt flow rate (MFR) of the polyethylene-based resin (B) is preferably 5.0 to 15 g/10 min, more preferably 6.0 to 14 g/10 min for reasons of easiness in carrying out the coextrusion.

The above-described morphology of the first embodiment or morphology of the second embodiment may be formed in the antistatic layer by using a method in which incorporation of a styrenic elastomer into the antistatic layer is additionally combined with incorporation of a specific amount of a polystyrene-based resin having a specific MFR or incorporation of a volatile plasticizer.

For reasons that the morphology of the first embodiment is formed while ensuring film forming property of the antistatic layer, it is preferred that the polystyrene-based resin has a melt flow rate (MFR) of 5.0 to 30 g/10 min. In particular, the MFR is more preferably 5.0 to 15 g/10 min, still more preferably 6.0 to 14 g/10 min, for reasons of easiness in extending the dispersed phases of the polystyrene-based resin in the plane direction of the sheet. Further, it is preferred that not only the MFR of the polystyrene-based resin falls within the above range but also the MFR thereof is about 0.5 to 2 times, more preferably 0.5 to 1.5 times, still more preferably 0.5 to 1 time that of the polyethylene-based resin (B).

The polystyrene-based resin is preferably contained in the antistatic layer in an amount of 15 to 50% by weight, more preferably 20 to 45% by weight, still more preferably 25 to 35% by weight for reasons of easiness in forming the morphology of the first embodiment. The content of the polyethylene-based resin (B) in the antistatic layer is preferably 40 to 75% by weight, more preferably 50 to 70% by weight.

In the coextrusion stage of the antistatic layer and the foam layer, if the polystyrene-based resin is excessively finely dispersed in the first melt for forming the antistatic layer it will become difficult for the polystyrene-based resin to deform in the polyethylene resin continuous phase when the continuous phase deforms at the time of extrusion. Thus, the polystyrene-based resin maintains its dispersed form and is liable to form granular dispersed phases. On the other hand, when the MFR of the polystyrene-based resin falls within the above-described range, the dispersion diameter of the polystyrene-based resin is able to be increased to the extent that the antistatic layer is able to be formed into a thin film. As a result, the polystyrene-based resin is extended in the plane direction of the sheet at the time of coextrusion.

For reasons that the morphology of the second embodiment is formed while ensuring film forming property of the antistatic layer, it is preferred that the polystyrene-based resin has a melt flow rate (MFR) of 5.0 to 15 g/10 min, more preferably 6.0 to 14 g/10 min.

Further, it is preferred not only that the MFR of the polystyrene-based resin is near that of the polyethylene-based resin (B) but also that the MFR thereof is about 0.5 to 2 times, more preferably 0.5 to 1.5 times, still more preferably 0.5 to 1 time that of the polyethylene-based resin (B).

For reasons of easiness in forming the morphology of the second embodiment, the polystyrene-based resin is preferably contained in the antistatic layer in an amount of 25 to 60% by weight. For the same reasons, the polystyrene-based resin content is preferably 30% by weight or more, still more preferably more than 35% by weight. The upper limit thereof is preferably 50%. The content of the polyethylene-based resin (B), on the other hand, is preferably 25 to 60% by weigh, more preferably 30 to 50% by weight.

As used herein, all MFR values are measured on the basis of JIS K7210(1999), Condition H (200° C., load of 5 kg).

It is preferred that the second melt for forming the antistatic layer contains a volatile plasticizer. As the volatile plasticizer, a substance which has a function to lower the melt viscosity of the second melt and which disappears by vaporization from the antistatic layer after the formation of the antistatic layer is used.

When the volatile plasticizer is incorporated into the second melt, the extrusion temperature for the second melt can be made near the extrusion temperature for the first melt at the time of coextrusion of the multi-layer foam sheet. Additionally, melt stretchability of the antistatic layer in a molten state is significantly improved. Thus, the cells of the foam sheet are less likely to be broken by the heat of the antistatic resin layer at the time of the foaming. Further, the antistatic layer can be stretched following the foam sheet which is stretched during the foaming stage. In particular, when the foam sheet is prepared by a method in which a circular die is used to extrude a tubular foamed body, the tubular foamed body being taken while enlarging the diameter thereof (blow up), the polystyrene-based resin dispersed phases in the antistatic layer may be extended in the plane direction of the multi-layer foam sheet to improve the stiffness thereof.

The volatile plasticizer is preferably one kind or two or more kinds selected from aliphatic hydrocarbons or alicyclic hydrocarbons having 3 to 7 carbon atoms, aliphatic alcohols having 1 to 4 carbon atoms and aliphatic ether having 2 to 8 carbon atoms. When a low volatile substance such as a so-called lubricant is used in place of the volatile plasticizer, the lubricant remains in the antistatic layer and may stain a surface of a material to be packaged. In contrast, the volatile plasticizer is preferable because it can efficiently plasticize the resin constituting the antistatic layer and because it hardly remains in the obtained antistatic layer.

The volatile plasticizer preferably has a boiling point of preferably 120° C. or less, more preferably 80° C. or less, for reasons of its easiness in vaporization from the antistatic layer. When the foam sheet obtained by coextrusion is allowed to stand, the volatile plasticizer which has a boiling point in the above range spontaneously volatilizes and is spontaneously removed from the antistatic layer by heat remaining therein immediately after the coextrusion and, further, by succeeding gas permeation at room temperature. The lower limit of the boiling point is about −50° C.

It is preferred that the volatile plasticizer is added in an amount of 5 to 50 parts by weight based on 100 parts by weight of a total amount of the polyethylene-based resin (B), the polystyrene-based resin, the styrenic elastomer and the polymeric antistatic agent that are used for forming the antistatic layer.

To the extent that the object of the present invention is not impaired, the second melt may be added with various kinds of additives. Illustrative of the additive are an antioxidant, a heat stabilizer, a weathering agent, a UV absorbing agent, a flame retardant, a filler and an antibacterial agent. The addition amount of these additives is suitably determined in consideration of the object and effect of the additives and is preferably 10 parts by weight or less, more preferably 5 parts by weight or less, particularly preferably 3 parts by weight or less, on the basis of the weight of the antistatic layer.

The physical blowing agent that is added to the first melt may be an organic physical blowing agent, for example, an aliphatic hydrocarbon such as propane, n-butane, isobutane, n-pentane, isopentane, n-hexane and isohexane, an alicyclic hydrocarbon such as cyclopentane and cyclohexane, a chlorinated hydrocarbon such as methyl chloride and ethyl chloride, a fluorinated hydrocarbon such as 1,1,1,2-tetrafluoroethane and 1,1-difluoroethane, and an inorganic physical blowing agent, for example, nitrogen, carbon dioxide, air and water. If desired, a decomposition-type foaming agent such as azodicarbonamide may be used.

These physical blowing agents may be used as a mixture of two or more thereof. Above all, organic physical blowing agents, particularly those which contain as their major ingredient n-butane, isobutane or a mixture thereof, are preferred for reasons of compatibility with the polyethylene resin and foaming efficiency.

The addition amount of the physical blowing agent is controlled in view of the kind of the blowing agent and the intended apparent density. The addition amount of the cell controlling agent is controlled in view of the intended cell diameter. For example, when a butane-containing mixture containing 30% by weight of isobutane and 70% by weight of n-butane is used as the blowing agent, the addition amount of the butane-containing mixture is 3 to 30 parts by weight, preferably 4 to 20 parts by weight, more preferably 6 to 18 parts by weight, based on 100 parts by weight of the base resin.

As one of the important additives to be added to the first melt, there is mentioned generally a cell controlling agent. As the cell controlling agent, either an inorganic powder or a chemical blowing agent may be used. Examples of the inorganic cell controlling agent include metal borates, such as zinc borate, magnesium borate and borax, sodium chloride, aluminum hydroxide, talc, zeolite, silica, calcium carbonate and sodium bicarbonate. Examples of the organic blowing agent include sodium 2,2-methylenebis(4,6-tert-butylphenyl)phosphate, sodium benzoate, calcium benzoate, aluminum benzoate and sodium stearate. Also usable as the cell controlling agent are, for example, a combination of citric acid and sodium bicarbonate and a combination of an alkali metal salt of citric acid and sodium bicarbonate. These cell controlling agents may be as a mixture of two or more thereof. The cell controlling agent is added in an amount of 0.01 to 3 parts by weight, preferably 0.03 to 1 part by weight based on 100 parts by weight of the polyethylene-based resin (A).

As preparation device such as a circular die and an extruder, there may be used any known device conventionally used in the field of extrusion foaming.

The multi-layer foam sheet according to the present invention, which has sufficient cushioning property and stiffness, may be suitably used as an interleaf sheet for glass plates. However, the uses of the multi-layer foam sheet are not limited only to the interleaf sheet for glass plates. The multi-layer foam sheet may be widely suitably used in other uses such as packaging materials for precision instruments.

EXAMPLES

The following examples will describe the present invention in more detail. The scope of the present invention is, however, not limited to the examples.

The polyethylene-based resins and polystyrene-based resins used in the examples are shown in Table 1, while the polymeric antistatic agent and styrenic elastomers are shown in Table 2. In Table 1, melt flow rate is a value measured on the basis of JIS K7210(1999), Condition H (200° C., load of 5 kg).

TABLE 1

| Abbreviation | Kind | Maker | Product name | Density (kg/m³) | Melting point (° C.) | MFR (g/10 min) |
|---|---|---|---|---|---|---|
| LDPE | low density polyethylene | Dow Chemical Japan Limited | NUC 8321 | 0.922 | 112 | 11.8 |
| GPPS1 | general purpose polystyrene | PS Japan Corporation | 680 | 1.05 | — | 7.0 |
| GPPS2 | general purpose polystyrene | PS Japan Corporation | 679 | 1.05 | — | 18.0 |
| HIPS | impact resistant polyethylene | PS Japan Corporation | 408 | 1.04 | — | 7.0 |

TABLE 2

| Abbreviation | Kind | | Maker | Product name |
|---|---|---|---|---|
| PAA | polymeric antistatic agent | ethylenic ionomer resin | Du-Pont Mitsui Polychemicals Co., Ltd. | SD100 |
| SBS | styrenic elastomer | styrene-butadiene-styrene block copolymer *1 | JSR Corporation | TR2000 |
| SEBS | styrenic elastomer | styrene-ethylene-butylene-styrene block copolymer *2 | Asahi Kasei Chemicals Corporation | H1041 |

*1: Content of the styrene component units of SBS is 40% by weight.
*2: Content of the styrene component units of SEBS is 30% by weight.

As the physical blowing agent and volatile plasticizer, mixed butane composed of 70% by weight of n-butane and 30% by weight of isobutane was used.

As a cell controlling agent, a cell controlling agent master batch composed of 20% by weight of talc (HI-FILLER #12 manufactured by Matsumura Sangyo Co., Ltd.) and 80% by weight of low density polyethylene was used.

As an extruder for forming a polyethylene resin foam layer, a tandem extruder having a first extruder with a diameter of 90 mm and a second extruder with a diameter of 120 mm was used. As an extruder for forming antistatic layers, a third extruder with a diameter of 50 mm and L/D of 50 was used. Each of the outlets of the second and third extruders was connected to a circular die for coextrusion so that respective molten resins can be laminated within the coextrusion circular die.

Examples 1 to 4 and Comparative Examples 1 to 3

The polyethylene resin in an amount shown in Table 3-1 and the cell controlling agent master batch in an amount shown in Table 3-1 were fed to a feed inlet port of the first extruder of the tandem extruder and melted and kneaded to obtain a molten resin mixture with a controlled temperature of about 200° C. Then, the mixed butane as a physical blowing agent was injected into the molten resin mixture in an amount shown in Table 3-1 and fed to the second extruder, where the mixture was temperature-adjusted to a temperature shown in Table 3-2 to obtain a first melt. The first melt was then introduced into the coextrusion circular die at a discharge rate shown in Table 3-2.

At the same time, the polyethylene resin, polystyrene resin, polymeric antistatic agent and styrenic elastomer with the formulation shown in Table 3-1 were fed to the third extruder and melted and kneaded. The kneaded mass was further added with the mixed butane as a volatile plasticizer in an amount shown in Table 3-1, and further kneaded to obtain a second melt. The second melt was adjusted to a resin temperature shown in Table 3-2 and fed to the coextrusion circular die at a discharge rate shown in Table 3-2.

The second melt which was fed to the coextrusion die was combined with and laminated on outer and inner sides of a tubular layer of the first melt that was fed to the coextrusion die and flowed through a flow channel of the die. The resulting laminate was extruded through the die with a lip diameter of 135 mm into the atmosphere to obtain a tubular laminate foam product with a three-layered structure of (antistatic layer)/(foam layer)/(antistatic layer). The tubular laminate foam product thus extruded was drawn while being enlarged (blow up ratio of 3.47) and cut open in the extrusion direction to obtain a multi-layer foam sheet.

TABLE 3-1

| | Foam Layer | | | Antistatic Layer | | |
|---|---|---|---|---|---|---|
| | Resin | Cell controlling agent | Blowing agent | Resin | | Volatile plasticizer |
| | Kind | Amount part by weight | Amount part by weight | Amount part by weight | Kind | Fomulation part by weight | Amount part by weight |
| Example 1 | LDPE | 100 | 2.8 | 15.8 | LDPE/GPPS2/PAA/SBS | 72/15/10/3 | 18 |
| Example 2 | LDPE | 100 | 2.8 | 15.9 | LDPE/GPPS2/PAA/SBS | 57/30/10/3 | 18 |
| Example 3 | LDPE | 100 | 2.8 | 15.9 | LDPE/GPPS2/PAA/SBS | 43/43/10/4 | 18 |
| Example 4 | LDPE | 100 | 2.8 | 15.2 | LDPE/GPPS2/PAA/SBS | 43/43/10/4 | 18 |
| Comparative Example 1 | LDPE | 100 | 2.8 | 15.3 | LDPE/PAA | 90/10 | 18 |
| Comparative Example 2 | LDPE | 100 | 2.8 | 15.7 | LDPE/GPPS2/PAA/SBS | 77/10/10/3 | 18 |
| Comparative Example 3 | LDPE | 100 | 2.8 | 16.0 | LDPE/GPPS2/PAA/SBS | 10/75/10/5 | 18 |

TABLE 3-2

| | Production Conditions | | | | | |
|---|---|---|---|---|---|---|
| | Extruded resin temperature | | Discharge rate | | | Drawing rate m/min |
| | Foam layer °C. | Antistatic layer °C. | Foam layer kg/h | Outer antistatic layer kg/h | Inner antistatic layer kg/h | |
| Example 1 | 116 | 123 | 90 | 7 | 7 | 60 |
| Example 2 | 116 | 123 | 90 | 7 | 7 | 60 |
| Example 3 | 116 | 123 | 90 | 7 | 7 | 60 |
| Example 4 | 115 | 123 | 90 | 13 | 13 | 67 |
| Comparative Example 1 | 116 | 120 | 90 | 7 | 7 | 60 |
| Comparative Example 2 | 116 | 123 | 90 | 7 | 7 | 60 |
| Comparative Example 3 | 116 | 125 | 90 | 7 | 7 | 60 |

Various physical properties of the multi-layer foam sheets obtained in Examples 1 to 4 and Comparative Examples 1 to 3 are shown in Table 4.

TABLE 4

| | Whole Sheet | | | Antistatic Layer Basis weight per layer (g/m²) | Evaluation | | |
|---|---|---|---|---|---|---|---|
| | Thickness (mm) | Basis weight (g/m²) | Apparent density (kg/m³) | | Film forming property | Sag in horizontal position (mm) | Surface resistivity (Ω) |
| Example 1 | 0.49 | 23.5 | 48.0 | 1.5 | good | 34.0 | $5.2 \times 10^{12}$ Ω |
| Example 2 | 0.50 | 23.6 | 47.2 | 1.5 | good | 29.7 | $4.1 \times 10^{12}$ Ω |
| Example 3 | 0.47 | 23.5 | 50.0 | 1.5 | good | 25.2 | $2.5 \times 10^{12}$ Ω |
| Example 4 | 0.56 | 23.4 | 41.8 | 2.7 | good | 14.3 | $1.8 \times 10^{12}$ Ω |
| Comparative Example 1 | 0.47 | 23.5 | 50.0 | 1.5 | good | 42.2 | $3.3 \times 10^{15}$ Ω |
| Comparative Example 2 | 0.47 | 23.7 | 50.4 | 1.5 | good | 40.7 | $3.3 \times 10^{12}$ Ω |
| Comparative Example 3 | 0.45 | 23.6 | 52.4 | 1.5 | poor | — | $2.7 \times 10^{12}$ Ω |

Examples 5 to 9 and Comparative Examples 4 to 7

The polyethylene resin in an amount shown in Table 5-1 and the cell controlling agent master batch in an amount shown in Table 5-1 were fed to a feed inlet port of the first extruder of the tandem extruder and melted and kneaded to obtain a molten resin mixture with a controlled temperature of about 200° C. Then, the mixed butane as a physical blowing agent was injected into the molten resin mixture in an amount shown in Table 5-1. Thereafter, the resulting mixture was fed to the second extruder connected to the downstream side of the first extruder and was temperature-adjusted to a temperature shown in Table 5-2 to obtain a first melt. The first melt was then introduced into the coextrusion circular die at a discharge rate shown in Table 5-2.

At the same time, the polyethylene resin, polystyrene resin, polymeric antistatic agent and styrenic elastomer with the formulation shown in Table 5-1 were fed to the third extruder and melted and kneaded. The kneaded mass was further added with the mixed butane as a volatile plasticizer in an amount shown in Table 5-1, and further kneaded to obtain a second melt. The second melt was adjusted to a resin temperature shown in Table 5-2 and fed to the coextrusion circular die at a discharge rate shown in Table 5-2.

The second melt which was fed to the coextrusion die was combined with and laminated on outer and inner sides of a tubular layer of the first melt that was fed to the coextrusion die and flowed through a flow channel of the die. The resulting laminate was extruded through the die with a lip diameter of 135 mm into the atmosphere to obtain a tubular laminate foam product with a three-layered structure of (antistatic layer)/(foam layer)/(antistatic layer). In Examples 5 to 7 and Comparative Examples 4 and 5, the tubular laminate foam product thus extruded was drawn while being enlarged (blow up ratio of 3.47), cut open in the extrusion direction and wound into a roll to obtain a multi-layer foam sheet having a width of 1,400 mm. In Examples 8 and 9 and Comparative Examples 6 and 7, the tubular laminate foam product thus extruded was drawn while being enlarged (blow up ratio of 2.85), cut open in the extrusion direction and wound into a roll obtain a multi-layer foam sheet having a width of 1,150 mm. In Comparative Example 5, since the styrenic elastomer was not contained in the antistatic layer containing the polystyrene-based resin, the film forming property of the antistatic layer was so poor that the multi-layer foam sheet obtained had a rough surface.

TABLE 5-2

| | Production Conditions | | | | |
|---|---|---|---|---|---|
| | Extruded resin temperature | | Discharge rate | | |
| | Foam layer °C. | Antistatic layer °C. | Foam layer kg/h | Outer antistatic layer kg/h | Inner antistatic layer kg/h | Drawing rate m/min |
| Example 5 | 116 | 123 | 90 | 7 | 7 | 60 |
| Example 6 | 116 | 123 | 90 | 7 | 7 | 60 |
| Example 7 | 116 | 123 | 90 | 7 | 7 | 60 |
| Example 8 | 116 | 122 | 90 | 9 | 9 | 56 |
| Example 9 | 116 | 123 | 80 | 10 | 10 | 24 |
| Comparative Example 4 | 116 | 120 | 90 | 7 | 7 | 60 |
| Comparative Example 5 | 116 | 123 | 90 | 7 | 7 | 60 |
| Comparative Example 6 | 116 | 120 | 90 | 9 | 9 | 56 |
| Comparative Example 7 | 116 | 120 | 80 | 10 | 10 | 24 |

Various physical properties of the multi-layer foam sheets obtained in Examples 5 to 9 and Comparative Examples 4 to 7 are shown in Tables 6-1 and 6-2.

TABLE 5-1

| | Foam Layer | | | Antistatic Layer | | |
|---|---|---|---|---|---|---|
| | Resin | Cell controlling agent | Blowing agent | Resin | | Volatile plasticizer |
| | Kind | Amount part by weight | Amount part by weight | Amount part by weight | Kind | Formulation part by weight | Amount part by weight |
| Example 5 | LDPE | 100 | 2.8 | 15.8 | LDPE/GPPS1/PAA/SBS | 65/20/10/5 | 18 |
| Example 6 | LDPE | 100 | 2.8 | 15.9 | LDPE/GPPS1/PAA/SBS | 55/30/10/5 | 18 |
| Example 7 | LDPE | 100 | 2.8 | 15.8 | LDPE/HIPS/PAA/SBS | 55/30/10/5 | 18 |
| Example 8 | LDPE | 100 | 2.8 | 15.7 | LDPE/HIPS/PAA/SEBS | 55/30/10/5 | 18 |
| Example 9 | LDPE | 100 | 2.2 | 8.2 | LDPE/GPPS1/PAA/SBS | 65/20/10/5 | 15 |
| Comparative Example 4 | LDPE | 100 | 2.8 | 15.3 | LDPE/PAA | 90/10 | 18 |
| Comparative Example 5 | LDPE | 100 | 2.8 | 15.9 | LDPE/GPPS1/PAA | 70/20/10 | 18 |
| Comparative Example 6 | LDPE | 100 | 2.8 | 15.9 | LDPE/PAA | 90/10 | 18 |
| Comparative Example 7 | LDPE | 100 | 2.2 | 8.3 | LDPE/PAA | 90/10 | 15 |

TABLE 6-1

| | Whole Multi-Layer Foam Sheet | | | | Antistatic Layer | |
|---|---|---|---|---|---|---|
| | Thickness (mm) | Apparent density (kg/m$^3$) | Basis weight (g/m$^2$) | Width (mm) | Closed cell content (%) | Basis weight per layer (g/m$^2$) | Morphology PE/PS/PAA |
| Example 5 | 0.51 | 47 | 24 | 1400 | 33 | 1.5 | sea/island/island |
| Example 6 | 0.47 | 50 | 24 | 1400 | 23 | 1.5 | sea/island/island |
| Example 7 | 0.48 | 50 | 23 | 1400 | 24 | 1.5 | sea/island/island |
| Example 8 | 0.31 | 90 | 28 | 1150 | 28 | 2.4 | sea/island/island |
| Example 9 | 0.62 | 98 | 61 | 1150 | 35 | 6.0 | sea/island/island |
| Comparative Example 4 | 0.47 | 50 | 24 | 1400 | 32 | 1.5 | — |
| Comparative Example 5 | 0.45 | 52 | 23 | 1400 | 22 | 1.5 | not observed |
| Comparative Example 6 | 0.32 | 88 | 28 | 1150 | 27 | 2.4 | — |
| Comparative Example 7 | 0.62 | 100 | 61 | 1150 | 39 | 6.0 | — |

TABLE 6-2

| | Evaluation | | | |
|---|---|---|---|---|
| | Film forming property | Sag in horizontal position (mm) | Sag in 60° slanted position (mm) | Surface resistivity (Ω) |
| Example 5 | good | 27.6 | 17.2 | $5.4 \times 10^{11}$ Ω |
| Example 6 | good | 25.2 | 15.7 | $2.8 \times 10^{11}$ Ω |
| Example 7 | good | 26.8 | 16.3 | $5.8 \times 10^{11}$ Ω |
| Example 8 | good | 33.5 | 21.3 | $7.2 \times 10^{10}$ Ω |
| Example 9 | good | 22.3 | 14.2 | $1.2 \times 10^{12}$ Ω |
| Comparative Example 4 | good | 42.2 | 26.5 | $3.3 \times 10^{15}$ Ω |
| Comparative Example 5 | poor | 40.3 | 27.2 | $4.5 \times 10^{13}$ Ω |
| Comparative Example 6 | good | 46.2 | 30.2 | $2.7 \times 10^{15}$ Ω |
| Comparative Example 7 | good | 38.5 | 25.1 | $6.5 \times 10^{15}$ Ω |

The multi-layer foam sheets obtained in Examples 5 and 6 were measured for the morphology of their antistatic layer by the following method. A test piece having the antistatic layer was first cut out from each multi-layer foam sheet. The test piece was stained with ruthenium tetraoxide and sliced in the extrusion direction of the multi-layer foam sheet to obtain an ultra thin test piece. The ultra thin test piece was then observed using a transmission electron microscope (H-7100 manufactured by Hitachi Ltd.) at an accelerating voltage of 100 kV.

Figure 2:
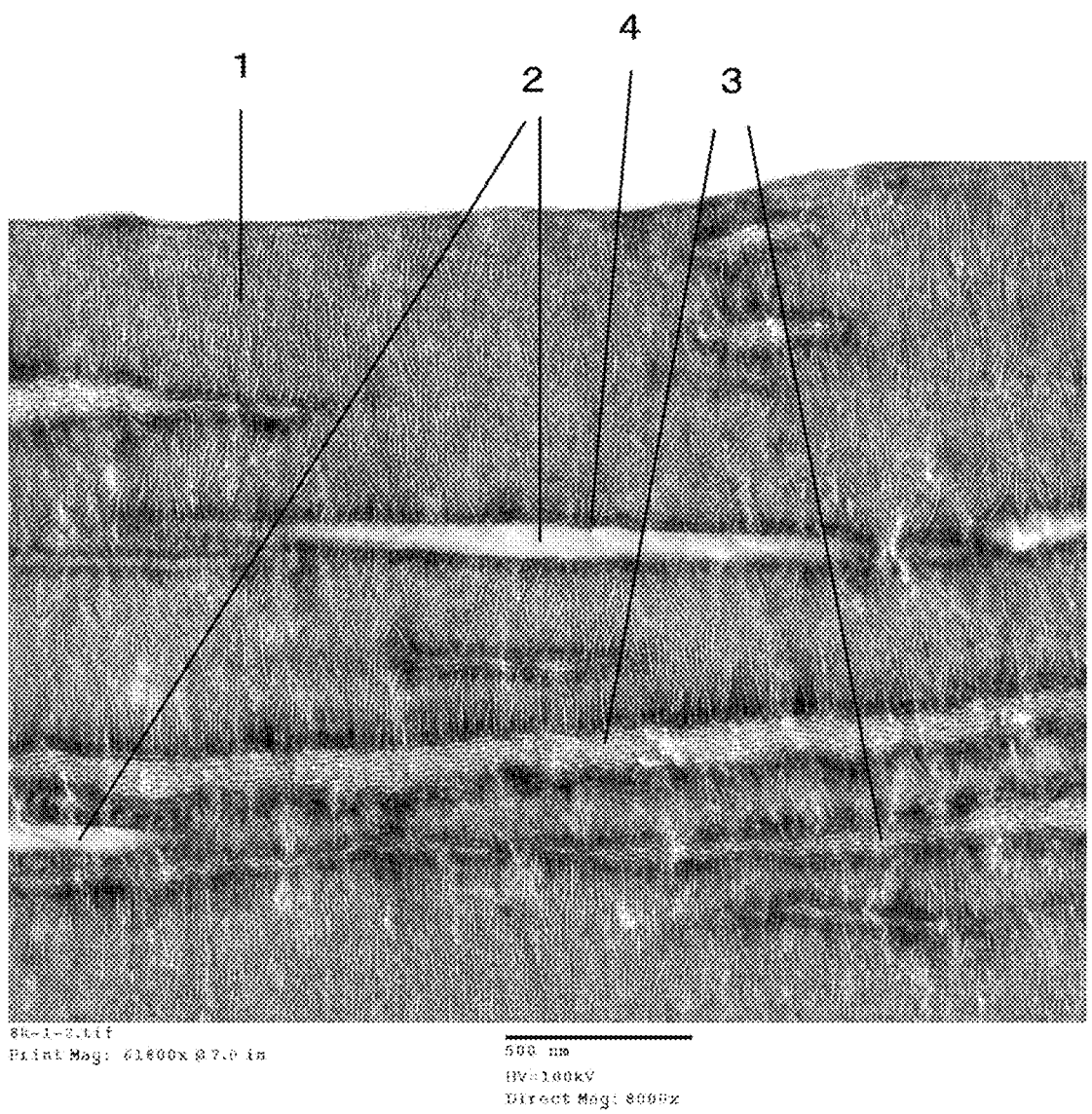
FIG. 2 is a transmission electron photomicrograph (at magnification of 61,800) of a longitudinal cross-section of an antistatic layer of a multilayer foam sheet obtained in Example 5.
Figure 3:
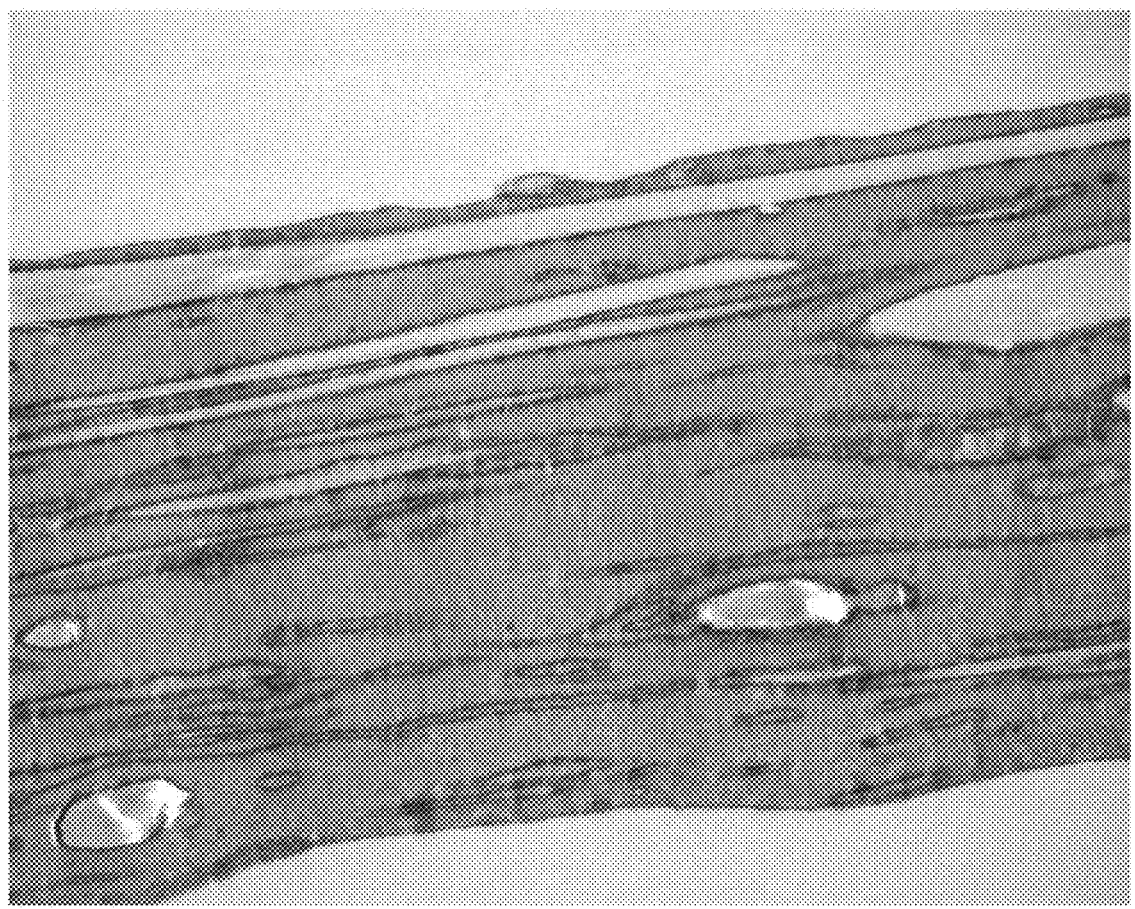
FIG. 3 is a transmission electron photomicrograph (at magnification of 15,400) of a longitudinal cross-section of an antistatic layer of a multilayer foam sheet obtained in Example 6.
Figure 4:
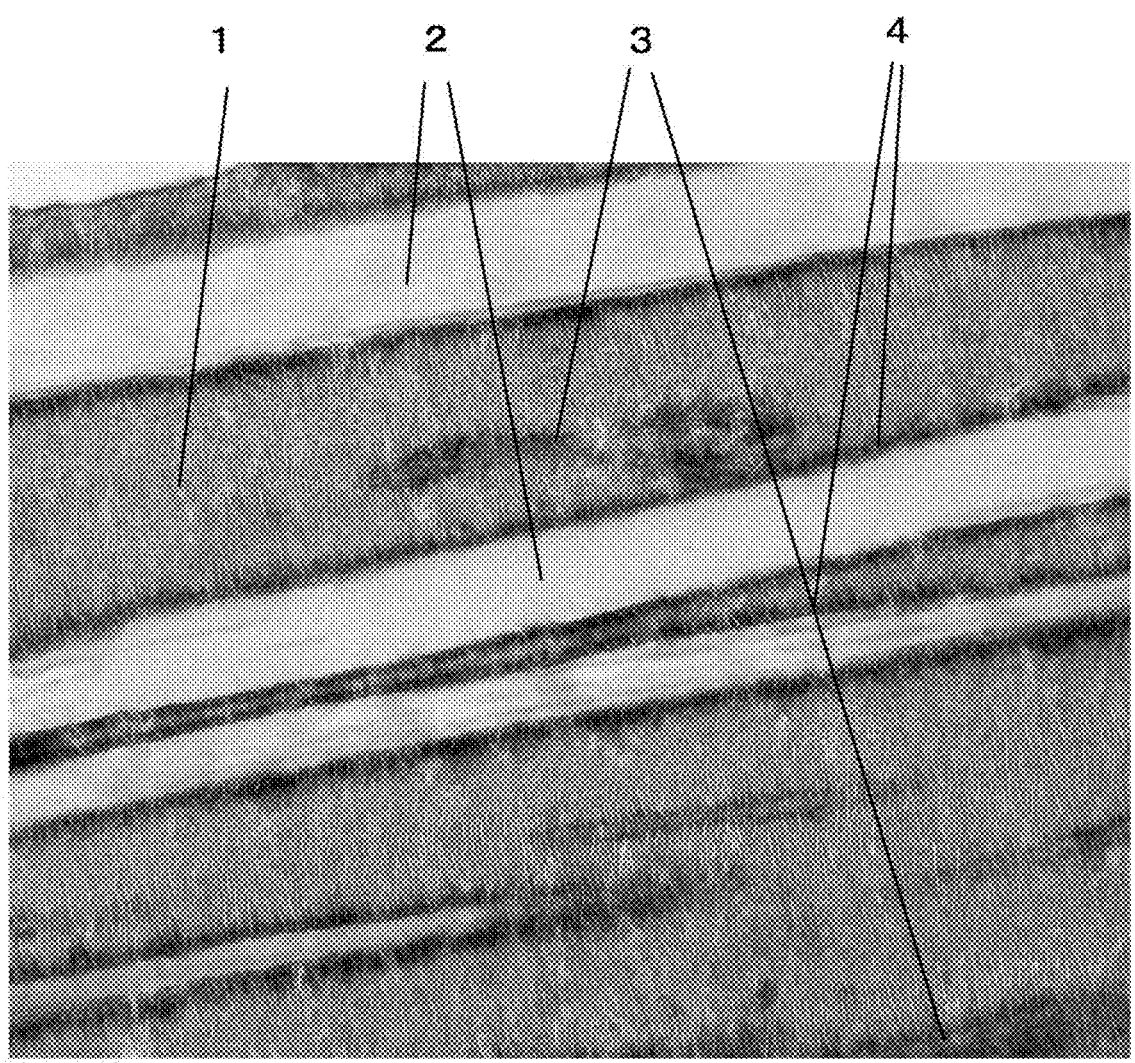
FIG. 4 is a transmission electron photomicrograph (at magnification of 61,800) of a longitudinal cross-section of an antistatic layer of a multilayer foam sheet obtained in Example 6.

Transmission electron photomicrographs of a vertical cross-section of the antistatic layer of the multilayer foam sheet obtained in Example 5 are shown in FIG. 1 and FIG. 2, while transmission electron photomicrographs of a vertical cross-section of the antistatic layer of the multilayer foam sheet obtained in Example 6 are shown in FIG. 3 and FIG. 4. In FIG. 1 to FIG. 4, morphology (sea/island/island) in which the polyethylene-based resin (PE) 1 forms a continuous phase (sea), the polystyrene-based resin (PS) 2 forms dispersed phases (islands) that are dispersed in the continuous phase of the polyethylene-based resin 1, and the polymeric antistatic agent (PAA) 3 also forms dispersed phases (islands) that are dispersed in the continuous phase of the polyethylene-based resin 1 is confirmed. The styrenic elastomer 4 is mainly present in the boundaries between the polyethylene-based resin 1 and the polystyrene-based resin 2. Further, a greater part of the polystyrene-based resin 2 forms dispersed phases which extend in the plane direction of the multi-layer foam sheet and which have an aspect ratio of 3 or more. Similar morphology was also observed in the multi-layer foam sheets obtained in Examples 7 to 9.

Examples 10 to 12 and Comparative Examples 8 and 9

The polyethylene resin in an amount shown in Table 7-1 and the cell controlling agent master batch in an amount shown in Table 7-1 were fed to a feed inlet port of the first extruder of the tandem extruder and melted and kneaded to obtain a molten resin mixture with a controlled temperature of about 200° C. Then, the mixed butane as a physical blowing agent was injected into the molten resin mixture in an amount shown in Table 7-1. Thereafter, the resulting mixture was fed to the second extruder connected to the downstream side of the first extruder and was temperature-adjusted to a temperature shown in Table 7-2 to obtain a first melt. The first melt was then introduced into the coextrusion circular die at a discharge rate shown in Table 7-2.

At the same time, the polyethylene resin, polystyrene resin, polymeric antistatic agent and styrenic elastomer with the formulation shown in Table 7-1 were fed to the third extruder and melted and kneaded. The kneaded mass was further added with the mixed butane as a volatile plasticizer in an amount shown in Table 7-1, and further kneaded to obtain a second melt. The second melt was adjusted to a resin temperature shown in Table 7-2 and fed to the coextrusion circular die at a discharge rate shown in Table 7-2.

The second melt which was fed to and flowed in the coextrusion die was combined with and laminated on outer and inner sides of a tubular layer of the first melt that was fed to the coextrusion die and flowed through a flow channel of the die. The resulting laminate was extruded through the die with a lip diameter of 135 mm into the atmosphere to obtain a tubular laminate foam product with a three-layered structure of (antistatic layer)/(foam layer)/(antistatic layer). The tubular laminate foam product thus extruded was drawn while being enlarged (blow up ratio of 3.47), cut open in the extrusion direction and wound into a roll to obtain a multi-layer foam sheet having a width of 1,400 mm.

TABLE 7-1

| | Foam Layer | | | Antistatic Layer | | |
|---|---|---|---|---|---|---|
| | Resin | | Cell controlling agent | Blowing agent | Resin | | Volatile plasticizer |
| | Kind | Amount part by weight | Amount part by weight | Amount part by weight | Kind | Formulation part by weight | Amount part by weight |
| Example 10 | LDPE | 100 | 2.8 | 15.8 | LDPE/GPPS1/PAA/SBS | 45/40/10/5 | 18 |
| Example 11 | LDPE | 100 | 2.8 | 15.9 | LDPE/GPPS1/PAA/SBS | 35/50/10/5 | 18 |
| Comparative Example 8 | LDPE | 100 | 2.8 | 15.3 | LDPE/PAA | 90/10 | 18 |
| Comparative Example 9 | LDPE | 100 | 2.8 | 15.7 | LDPE/GPPS1/PAA/SBS | 77/10/10/3 | 18 |
| Example 12 | LDPE | 100 | 2.8 | 15.9 | LDPE/GPPS2/PAA/SBS | 43/43/10/4 | 18 |

TABLE 7-2

| | Production Conditions | | | | | |
|---|---|---|---|---|---|---|
| | Extruded resin temperature | | Discharge rate | | | Drawing rate |
| | Foam layer °C. | Antistatic layer °C. | Foam layer kg/h | Outer antistatic layer kg/h | Inner antistatic layer kg/h | m/min |
| Example 10 | 116 | 123 | 90 | 7 | 7 | 60 |
| Example 11 | 116 | 123 | 90 | 7 | 7 | 60 |
| Comparative Example 8 | 116 | 120 | 90 | 7 | 7 | 60 |
| Comparative Example 9 | 116 | 122 | 90 | 7 | 7 | 60 |
| Example 12 | 116 | 123 | 90 | 7 | 7 | 60 |

Various physical properties of the multi-layer foam sheets obtained in Examples 10 to 12 and Comparative Examples 8 and 9 are shown in Tables 8-1 and 8-2.

TABLE 8-1

| | Whole Multi-Layer Foam Sheet | | | | | Antistatic Layer | |
|---|---|---|---|---|---|---|---|
| | Thickness (mm) | Apparent density (kg/m³) | Basis weight (g/m²) | Width (mm) | Closed cell content (%) | Basis weight per layer (g/m²) | Morphology PE/PS/ASA |
| Example 10 | 0.47 | 50 | 24 | 1400 | 31 | 1.5 | sea/sea/island |
| Example 11 | 0.48 | 50 | 24 | 1400 | 31 | 1.5 | sea/sea/island |
| Comparative Example 8 | 0.47 | 50 | 24 | 1400 | 32 | 1.5 | — |
| Comparative Example 9 | 0.48 | 50 | 24 | 1400 | 26 | 1.5 | sea/island/island |
| Example 12 | 0.47 | 50 | 24 | 1400 | 23 | 1.5 | sea/island/island |

TABLE 8-2

| | Evaluation | | | |
|---|---|---|---|---|
| | Film forming property | Sag in horizontal position (mm) | Sag in 60° slanted position (mm) | Surface resistivity (Ω) |
| Example 10 | good | 18.9 | 7.6 | $3.1 \times 10^{12} \Omega$ |
| Example 11 | good | 17.2 | 5.1 | $2.8 \times 10^{12} \Omega$ |
| Comparative Example 8 | good | 42.2 | 26.5 | $3.3 \times 10^{15} \Omega$ |
| Comparative Example 9 | good | 39.5 | 22.4 | $6.2 \times 10^{12} \Omega$ |
| Example 12 | good | 25.2 | 15.7 | $2.5 \times 10^{12} \Omega$ |

The morphology of the antistatic layers was measured by the following method. A test piece was first cut out from a surface of each of the multi-layer foam sheets. The test piece was stained with ruthenium tetraoxide and sliced to obtain an ultra thin test piece. The ultra thin test piece was then observed using a transmission electron microscope (H-7100 manufactured by Hitachi Ltd.) at an accelerating voltage of 100 kV.

Figure 7:
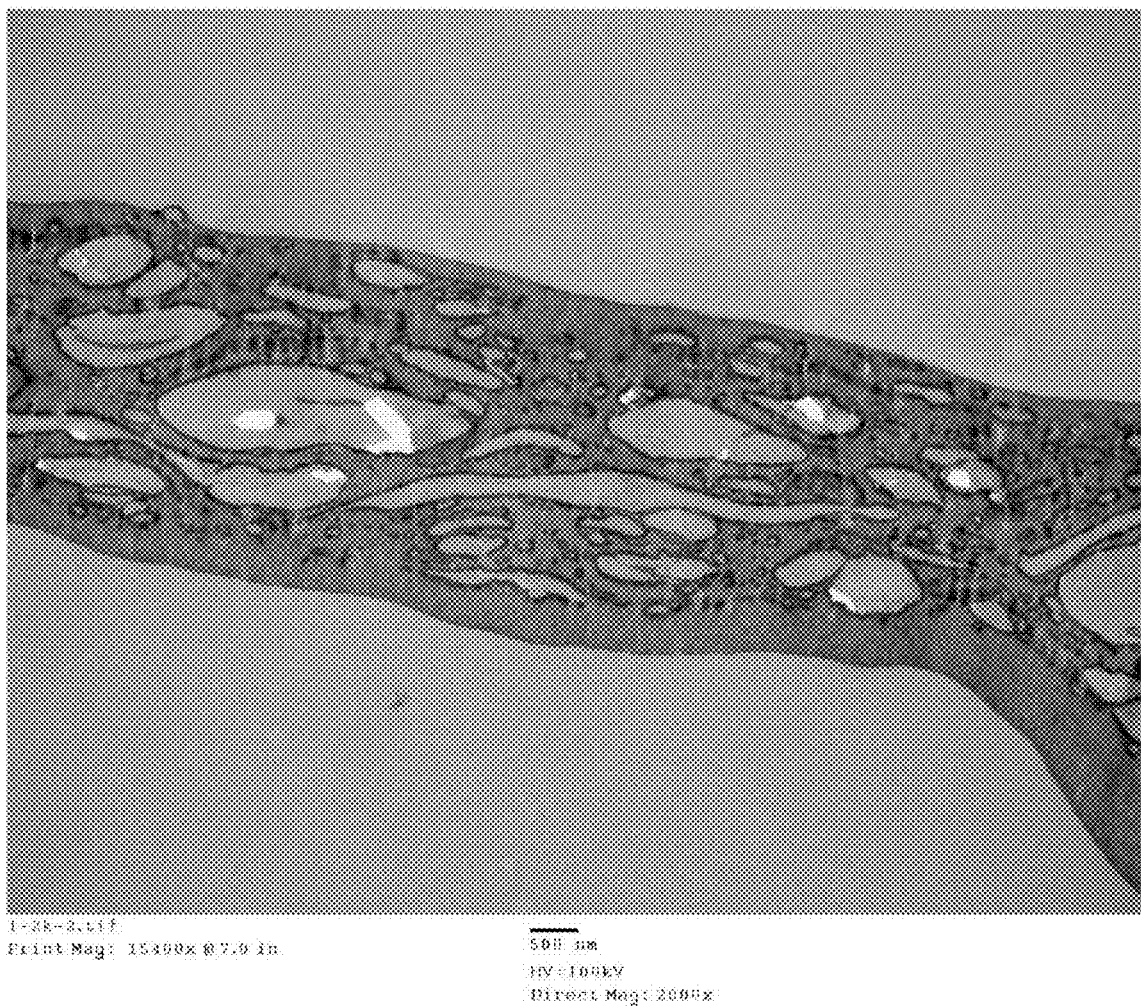
FIG. 7 is a transmission electron photomicrograph (at magnification of 15,400) of a longitudinal cross-section of an antistatic layer of a multilayer foam sheet obtained in Example 12.
Figure 8:
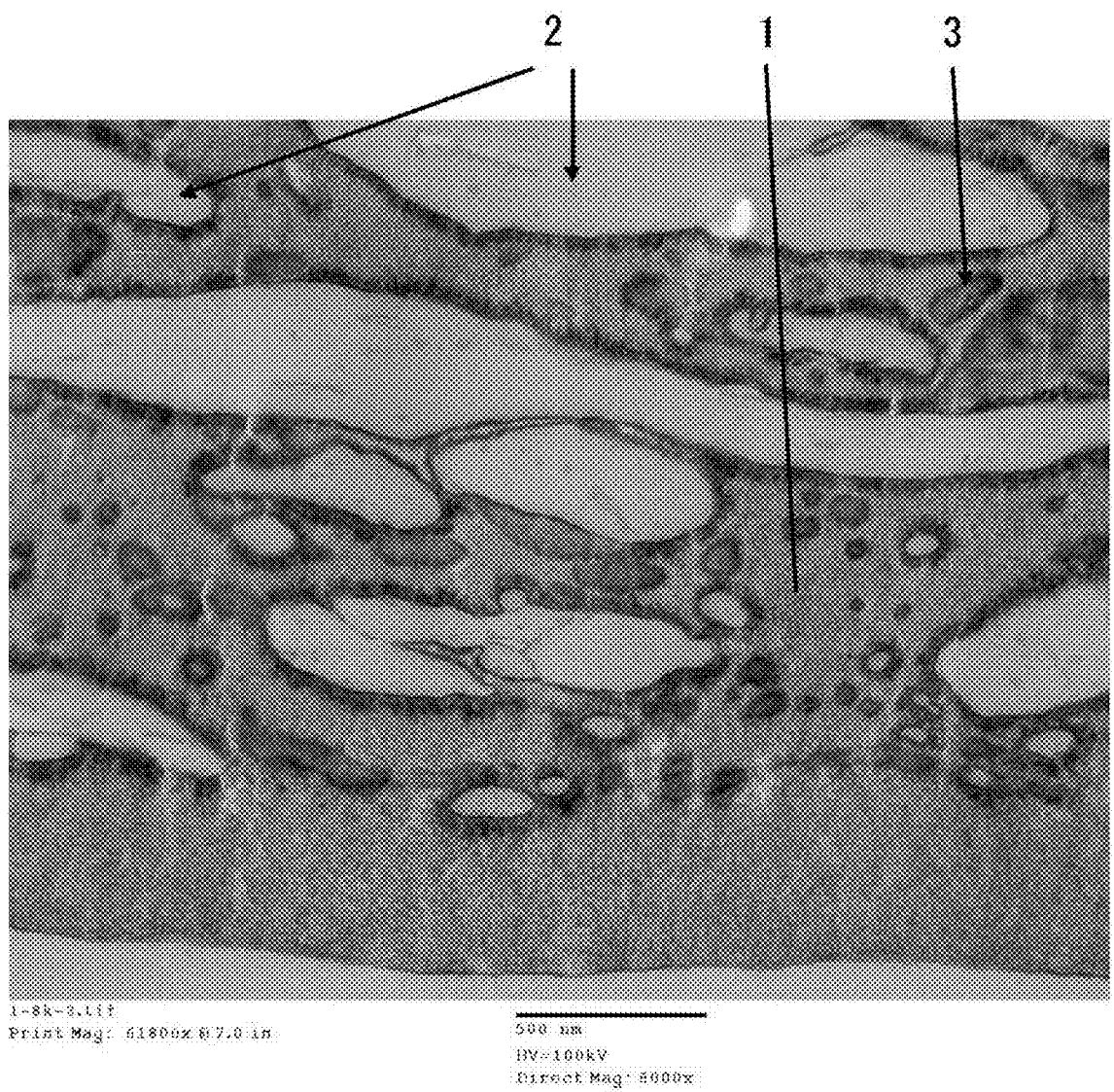
FIG. 8 is a transmission electron photomicrograph (at magnification of 61,800) of a longitudinal cross-section of an antistatic layer of a multilayer foam sheet obtained in Example 12.

Transmission electron photomicrographs of a cross-section of the antistatic layer of the multilayer foam sheet obtained in Example 10 are shown in FIG. 5 and FIG. 6, while transmission electron photomicrographs of a cross-section of the antistatic layer of the multilayer foam sheet obtained in Example 12 are shown in FIG. 7 and FIG. 8. In FIG. 5 to FIG. 6, it is confirmed that both of the polyethylene-based resin 1 and the polystyrene-based resin 2 form continuous phases (sea/sea) that are extended in the plane direction of the multi-layer foam sheet. Further, the polymeric antistatic agent 3 is found to form dispersed phases that are dispersed in the continuous phase of the polyethylene-based resin 1. Similar morphology of the antistatic layer was also observed in the multi-layer foam sheet obtained in Example 10.

As seen in FIG. 7 and FIG. 8, the polystyrene-based resin 2 does not form a continuous phase. Rather, the polystyrene-based resin 2 is found to form dispersed phases (islands) dispersed in the continuous phase (sea) of the polyethylene-based resin 1 (sea/island).

The thickness of the multi-layer foam sheets shown in Table 4-1, Table 6-1 and Table 8-1 was measured by the method described previously (n=5).

The basis weight of the whole multi-layer foam sheet was measured as follows. A test piece having a width of 10 cm and a length that is equal to the entire width of the rolled multi-layer foam sheet was cut out. The weight of the cut piece was divided by (entire width)×(10 cm) to obtain the basis weight. In the same manner as above, basis weight values of total five test pieces were determined. The arithmetic mean of the values represents the basis weight of the whole multi-layer foam sheet (n=5).

The basis weight of the antistatic layer was determined from a ratio of discharge rate of the foam layer and antistatic layer on the basis of the above basis weight of the whole multi-layer foam sheet.

The apparent density of the multi-layer foam sheet was determined by dividing the basis weight of the whole multi-layer foam sheet by the thickness of the multi-layer foam sheet, followed by unit conversion.

The film forming property shown in Table 4-2, Table 6-2 and Table 8-2 was evaluated according to the following criteria:

good: No torn portions are present in the antistatic layer of the obtained multi-layer foam sheet.

poor: Torn portions are present in the antistatic layer of the obtained multi-layer foam sheet.

The sag in horizontal position shown in Table 4, Table 6-2 and Table 8-2 was measured as follows.

Amount of Sag in Horizontal Position:

Ten measurement test pieces each having a width of 100 mm and a length of 200 mm were cut out from the obtained multi-layer foam sheet at arbitrarily selected ten positions such that the lengthwise direction of each test piece coincided with the extrusion direction of the sheet. Each test piece was placed and fixed on a horizontal upper surface of a platform in such a state that a 100 mm length in the lengthwise direction of the test piece horizontally protruded out from an end thereof. The test piece thus sagged downward by its own weight from the upper surface of the platform. The vertical distance from the plane of the upper surface of the platform to the lowermost point of the sagged test piece was measured. Such a measurement was conducted for each of the test pieces. An arithmetic mean of the measured values represents an amount of sag in horizontal position.

The sag in 60° slanted position shown in Table 6-2 and Table 8-2 was measured as follows.

Amount of Sag in 60° Slanted Position:

Ten test pieces each having a width of 200 mm and a length of 200 mm were cut out from the obtained multi-layer foam sheet at arbitrarily selected ten positions such that the lengthwise direction of each test piece coincided with the extrusion direction of the sheet. Each test piece was placed and fixed on a platform surface, which was slanted upwardly at an angle of 60° from the horizontal plane, in such a state that a 100 mm length in the lengthwise direction of the test piece protruded straight from an upper end of the platform in the direction of extension of the platform surface. The test piece thus sagged downward by its own weight. The distance, perpendicular to the platform surface, from the free tip end of the sagged test piece to a phantom plane of extension of the platform surface was measured. Such a measurement was conducted for each of the test pieces. An arithmetic mean of the measured values represents an amount of sag in 60° slanted position.

The surface resistivity as antistatic performance of the multi-layer foam sheets shown in Table 4-2, Table 6-2 and Table 8-2 was measured as follows. The surface resistivity of the multi-layer foam sheets was measured according to JIS K6271(2001) as described previously. The surface resistivity was measured on both sides of a measurement sample. The surface resistivity of the multi-layer foam sheet is an arithmetic mean of the measured values.

The invention claimed is:

1. A multi-layer foam sheet with an apparent density of 30 to 300 kg/m$^3$ and a thickness of 0.05 to 2 mm, comprising a foam layer that comprises a polyethylene-based resin (A), and an antistatic layer that is fusion-laminated by coextrusion on each of both sides of the foam layer,
   wherein the antistatic layer has a basis weight of 1 to 10 g/m$^2$ and contains a polyethylene-based resin (B), a polystyrene-based resin, a styrenic elastomer and a polymeric antistatic agent, with the polystyrene-based resin being present in an amount of 15 to 70% by weight based on the weight of the antistatic layer,
   wherein the polyethylene-based resin (B) forms a continuous phase, while the polystyrene-based resin and the polymeric antistatic agent separately form dispersed phases that are dispersed in the continuous phase, and
   wherein the dispersed phases of the polystyrene-based resin extend in a plane direction of the multi-layer foam sheet.

2. The multi-layer foam sheet as recited in claim 1, wherein the dispersed phases of the polystyrene-based resin include those which have an aspect ratio of 3 or more in a vertical cross-section of the multi-layer foam sheet.

3. The multi-layer foam sheet as recited in claim 1, wherein the polystyrene-based resin has a melt flow rate of 5.0 to 15 g/10 min at a temperature 200° C. and a load of 5 kg and wherein the melt flow rate of the polystyrene-based resin is 0.5 to 1.5 times that of the polyethylene-based resin (B).

4. The multi-layer foam sheet as recited in claim 1, wherein the polystyrene-based resin is present in an amount of 15 to 50% by weight based on the weight of the antistatic layer.

5. The multi-layer foam sheet as recited in claim 1, wherein the styrenic elastomer is present in an amount of 2 to 20% by weight based on the weight of the antistatic layer.

6. The multi-layer foam sheet as recited in claim 1, wherein the polymeric antistatic agent is present in an amount of 2 to 30% by weight based on the weight of the antistatic layer.

7. The multi-layer foam sheet as recited in claim 1, wherein the polyethylene-based resin (A) contains low density polyethylene as a major component.

8. The multi-layer foam sheet as recited in claim 1, wherein the polyethylene-based resin (B) contains low density polyethylene as a major component.

9. An interleaf sheet for glass plates comprising a multi-layer foam sheet as recited in claim 1.

* * * * *